(12) United States Patent
Mutaguchi

(10) Patent No.: US 7,725,621 B2
(45) Date of Patent: May 25, 2010

(54) SEMICONDUCTOR DEVICE AND DATA TRANSFER METHOD

(75) Inventor: Kohei Mutaguchi, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 458 days.

(21) Appl. No.: 11/706,983

(22) Filed: Feb. 16, 2007

(65) Prior Publication Data

US 2008/0005387 A1 Jan. 3, 2008

(30) Foreign Application Priority Data

Jun. 30, 2006 (JP) ............................. 2006-180952

(51) Int. Cl.
*G06F 13/28* (2006.01)
*G06F 13/00* (2006.01)

(52) U.S. Cl. .............................. 710/22; 710/20; 710/31; 710/36; 710/7; 712/226; 712/228; 712/229; 370/235

(58) Field of Classification Search ........................ None
See application file for complete search history.

(56) References Cited

U.S. PATENT DOCUMENTS 5,623,622 A * 4/1997 Yuki et al. .................. 711/100
5,889,776 A * 3/1999 Liang ......................... 370/389
6,330,623 B1 * 12/2001 Wu et al. ..................... 710/23

OTHER PUBLICATIONS

Patent Abstracts of Japan, Publication No. 08-194660, Published Jul. 30, 1996.

* cited by examiner

*Primary Examiner*—Eron J Sorrell
*Assistant Examiner*—Dean Phan
(74) *Attorney, Agent, or Firm*—Fujitsu Patent Center

(57) ABSTRACT

A semiconductor device and data transfer method capable of efficient DMA transfer processing. The device comprises: a sector buffer which temporarily stores data during transfer, the buffer having an I/O port used for DMA transfer with a system bus and having an I/O port used for data transfer with the I/O controller; a switching section which switches whether to connect between the system bus and the I/O controller, or to connect between the sector buffer and the I/O controller or the system bus; and a sector buffer controller which separately starts data transfer through the I/O ports and which, when detecting completion of the data transfer of a transfer unit between the sector buffer and the I/O controller, transmits to the switching section a control signal for cutting off data transfer between the sector buffer and the I/O controller and for connecting the system bus and the I/O controller.

8 Claims, 14 Drawing Sheets

SEMICONDUCTOR DEVICE AND DATA TRANSFER METHOD

CROSS-REFERENCE TO RELATED APPLICATIONS

This application is based upon and claims the benefits of priority from the prior Japanese Patent Application No. 2006-180952, filed on Jun. 30, 2006, the entire contents of which are incorporated herein by reference.

BACKGROUND OF THE INVENTION

1. Field of the Invention

The present invention relates to a semiconductor device and a data transfer method. More particularly, the present invention relates to a semiconductor device and data transfer method for performing DMA transfer.

2. Description of the Related Art

In an information terminal such as a digital camera or a cellular phone, a memory card incorporating a nonvolatile memory such as a flash memory is used as a recording medium of data.

The memory card is controlled by a card controller incorporated in a system Large Scale Integrated circuit (LSI) mounted on an information terminal.

In a case of transferring data to the memory card, there is known a Program I/O transfer (PIO) where a Central Processing Unit (CPU) within the system LSI accesses a card as an Input/Output (I/O) device through the card controller. In the case of performing the data transfer by the PIO, the CPU is occupied during the data transfer. Therefore, when transferring large data, system throughputs are reduced.

On the other hand, there is known a Direct Memory Access (DMA) transfer where data transfer is directly performed between an I/O device and a memory without using a CPU. By using the DMA transfer, large data can be transferred without disturbing processing of the CPU.

In order to perform the DMA transfer, the I/O device must generally have a DMA interface. The reason is that the DMA interface is required to interpret a signal such as a DMA transfer request signal or DMA transfer permission signal transmitted to and received from a DMA controller. In the meanwhile, a DMA transfer method capable of the DMA transfer without the DMA interface is disclosed, for example, in Japanese Unexamined Patent Application Publication No. Hei 8-194660.

FIG. 12 shows a configuration of a conventional semiconductor device for performing DMA transfer to and from an I/O device having no DMA interface.

A semiconductor device 500 has a CPU 501, a memory 502, a DMA controller 503, a switching section 504 and a request generating section 505. In the device 500, these are connected to a system bus 506. FIG. 12 shows the following case. A memory card 507a is used as the I/O device. The semiconductor device 500 incorporates a card controller 507. The card controller 507 is connected to the system bus 506 through the switching section 504. The CPU 501 and the DMA controller 503 are masters of the system bus 506, and the card controller 507 is a slave thereof.

Herein, the switching section 504 switches whether to connect between the CPU 501 and the card controller 507, or to connect between the DMA controller 503 and the card controller 507. Specifically, when the CPU 501 is a master, the section 504 connects the CPU 501 to the card controller 507 so as to transmit to the card controller 507 a control signal such as an address signal or a chip select signal, or data.

On the other hand, when the DMA controller 503 is a master, the switching section 504 cuts off a control signal from the CPU 501 and transmits to the card controller 507 a chip select signal newly generated from a DMA transfer permission signal inputted from the DMA controller 503, a fixed address signal (I/O port address), and data of the memory 502 connected to the system bus 506.

The request generating section 505 transmits a DMA transfer request signal to the DMA controller 503 at a constant interval set in an interval setting section 508.

FIG. 13 is a timing chart showing a signal state during data transfer of the conventional semiconductor device.

This timing chart shows a bus clock transmitted through the system bus 506, a chip select signal/CSa outputted by the CPU 501, a DMA transfer permission signal issued to the switching section 504 by the DMA controller 503, a DMA transfer ready signal and DMA transfer request signal transmitted to the DMA controller 503 by the request generating section 505, a chip select signal/CSb inputted to the card controller 507, and data of the system bus 506.

FIG. 13 shows a case where an access cycle of the card controller 507 is three clock cycles.

During PIO transfer, the chip select signal/CSa issued by the CPU 501 is used as the chip select signal/CSb of the card controller 507. In other words, the switching section 504 transmits a control signal from the CPU 501 to the card controller 507. Thus, data (valid in FIG. 13) is transferred by PIO between the memory 502 and the card controller 507 under the control of the CPU 501.

Successively, the DMA transfer request signal generated by the request generating section 505 is asserted (in FIG. 13, the signal goes to "H (High)"). At this time, an idle cycle is inserted until the DMA transfer permission signal generated by the DMA controller 503 is asserted to permit the transfer.

During the DMA transfer, the switching section 504 generates the chip select signal/CSb of the card controller 507 based on the DMA transfer permission signal issued by the DMA controller 503. In other words, the switching section 504 transmits a control signal from the DMA controller 503 to the card controller 507. Thus, data is transferred by DMA between the memory 502 and the card controller 507 under the control of the DMA controller 503.

Also during the DMA transfer, the chip select signal/CSb inputted to the card controller 507 must be generated such that an access cycle in the card controller 507 is the same as that in the PIO transfer. When the chip select signal/CSb is generated based on only the DMA transfer permission signal, the DMA transfer permission signal issued by the DMA controller 503 must be made active during the access cycle of the card controller 507 (three clock cycles herein). For example, when the request generating section 505 makes the DMA transfer ready signal "L (Low)" and transmits to the DMA controller 503 the information that the signal is in a state of transfer ready, the DMA transfer permission signal can be made active by necessary cycles. When the DMA transfer ready signal is unable to be used, the switching section 504 makes "L" the chip select signal/CSb inputted to the card controller 507 and starts asserting the chip select signal/CSb in response to a rising edge of the DMA transfer permission signal. When making the chip select signal/CSb active and "H" by the access cycles, the section 504 negates the signal.

When detecting a rising edge of the DMA transfer permission signal, the switching section 504 negates the DMA transfer request signal issued from the request generating section 505 to the DMA controller 503. The interval setting section 508 can set the number of cycles where the DMA transfer request signal is negated and then asserted. FIG. 13 shows a case of setting three clock cycles equivalent to the access cycle.

FIG. 14 is a flowchart showing operations during the DMA transfer to the memory card through the conventional semiconductor device.

First, setting of the transfer mode or issuance of the transfer command is performed from the CPU 501 to the card controller 507 through the switching section 504 (step S50).

Next, the DMA controller 503 is started to initiate the DMA transfer (step S51). When the DMA transfer is initiated, the request generating section 505 continues to issue at regular intervals a transfer request to the DMA controller 503 based on a value set in the interval setting section 508.

During the data transfer, whether data is normally transferred must be checked every time a constant amount of data is transferred (hereinafter referred to as a status check). It is determined whether the transfer of a transfer unit is completed (step S52). When the transfer of the transfer unit is completed, this status check is performed (step S53). The status check is performed by accessing the card controller 507 or the memory card 507a from the CPU 501 to read a status.

After the status check is performed, it is determined whether the data transfer is completed (step S54). When data desired to be transferred still remains, the operation returns to the processing in step S51. The DMA controller 503 is restarted to again initiate the transfer. Thereafter, the processings in steps S51 to S54 are repeated until transfer of the whole data is completed.

According to such a conventional semiconductor device 500, the DMA transfer can be performed using an I/O device without the DMA interface.

However, in the conventional semiconductor device 500 as shown in FIG. 12, while the request generating section 505 issues the DMA transfer request, the switching section 504 transmits to the card controller 507 a control signal from the DMA controller 503. Therefore, the CPU 501 is unable to access the card controller 507 or the memory card 507a. In order to access from the CPU 501, the DMA transfer must be completed. Accordingly, in the conventional semiconductor device 500, the DMA controller 503 must be restarted in each status check as shown in FIG. 14 and as a result, transfer processing suffering from high overhead is performed.

SUMMARY OF THE INVENTION

In view of the foregoing, it is an object of the present invention to provide a semiconductor device capable of high efficient transfer processing.

It is another object of the present invention to provide a data transfer method capable of high efficient transfer processing.

To accomplish the above-described objects, according to one aspect of the present invention, there is provided a semiconductor device for performing a DMA transfer processing. This semiconductor device comprises: an I/O controller which controls data transfer with an I/O device; a temporary storage section which temporarily stores data during transfer, the section having a first I/O port used for DMA transfer with a system bus and having a second I/O port used for data transfer with the I/O controller; a switching section which switches whether to connect between the system bus and the I/O controller, or to connect between the temporary storage section and the I/O controller or the system bus; and a storage controller which separately starts data transfer through the first and second I/O ports and which, when detecting completion of the data transfer of a transfer unit between the temporary storage section and the I/O controller, transmits to the switching section a control signal for cutting off data transfer between the temporary storage section and the I/O controller and for connecting the system bus and the I/O controller.

According to another aspect of the present invention, there is provided a data transfer method for performing a DMA transfer processing. This data transfer method comprises the steps of:

separately starting data transfer using a temporary storage section having first and second I/O ports, the first I/O port being used for DMA transfer with a system bus and the second I/O port being used for data transfer with the I/O controller; switching whether to connect between the system bus and the I/O controller, or to connect between the temporary storage section and the I/O controller or the system bus; and cutting off, when detecting completion of data transfer of a transfer unit between the temporary storage section and the I/O controller, the data transfer between the temporary storage section and the I/O controller to thereby connect the system bus and the I/O controller.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
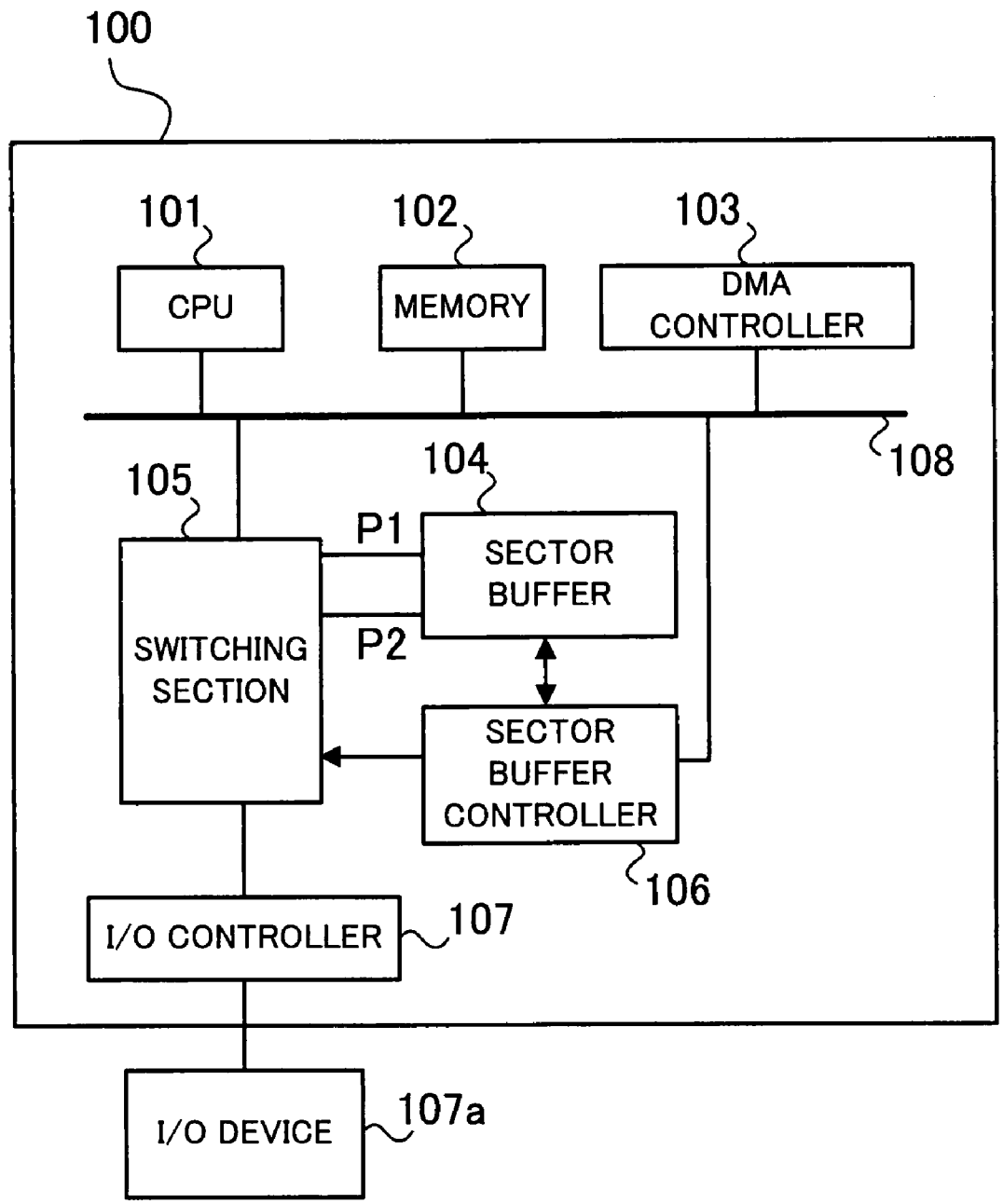
FIG. 1 shows a configuration of a semiconductor device according to a first embodiment.

Preferred embodiment of the present invention will be described in detail below with reference to the accompanying drawings, wherein like reference numerals refer to like elements throughout.

FIG. 1 shows a configuration of a semiconductor device according to a first embodiment.

A semiconductor device 100 of the first embodiment has a CPU 101, a memory 102, a DMA controller 103, a sector buffer 104, a switching section 105, a sector buffer controller 106 and an I/O controller 107. Further, the CPU 101, the memory 102, the DMA controller 103, the switching section 105 and the sector buffer controller 106 are connected to a system bus 108. In the following description, the system bus 108 includes an address bus for transmitting an address, a data bus for transmitting data and a control line for transmitting a control signal. The CPU 101 and the DMA controller 103 are masters of the system bus 108, and the I/O controller 107 is a slave thereof.

The CPU 101 controls each section of the semiconductor device 100 through the system bus 108.

The memory 102 stores data to be written in an I/O device 107a connected to the I/O controller 107 as well as data to be read from the I/O device 107a.

The DMA controller 103 controls the DMA transfer.

The sector buffer 104 is a temporary storage section which temporarily stores data during transfer. The sector buffer 104 has an I/O port P1 used for the DMA transfer with the system bus 108 and an I/O port P2 used for the data transfer with the I/O controller 107. In FIG. 1, the I/O ports P1 and P2 are connected to the switching section 105. Such a sector buffer 104 can be realized by using a dual-port Random Access Memory (RAM). Alternatively, two single-port RAMs may be used.

The switching section 105 switches whether to connect between the system bus 108 and the I/O controller 107, or to connect between the sector buffer 104 and the I/O controller 107 or the system bus 108.

The sector buffer controller 106 separately starts the data transfer through the I/O ports P1 and P2 of the sector buffer 104. Further, depending on the amount of data transferred between the sector buffer 104 and the I/O controller 107, the controller 106 outputs a control signal (hereinafter, referred to as a sector buffer busy signal) for switching a path connection in the switching section 105. In addition, according to the access cycle of the I/O controller 107, the controller 106 transmits a control signal such as a chip select signal, a read strobe signal, a write strobe signal and a byte enable signal, or an address signal to the I/O controller 107 through the switching section 105.

The I/O controller 107 controls the data transfer with the I/O device 107a. In the semiconductor device 100 according to the present embodiment, the I/O controller 107 requires no DMA interface.

Examples of the I/O device 107a include various devices requiring the data transfer, for example, a memory card incorporating a nonvolatile memory such as a flash memory, a Hard Disk Drive (HDD) and a printer. The I/O controller 107 includes a card controller and an Integrated Drive Electronics (IDE) controller.

Figure 2:
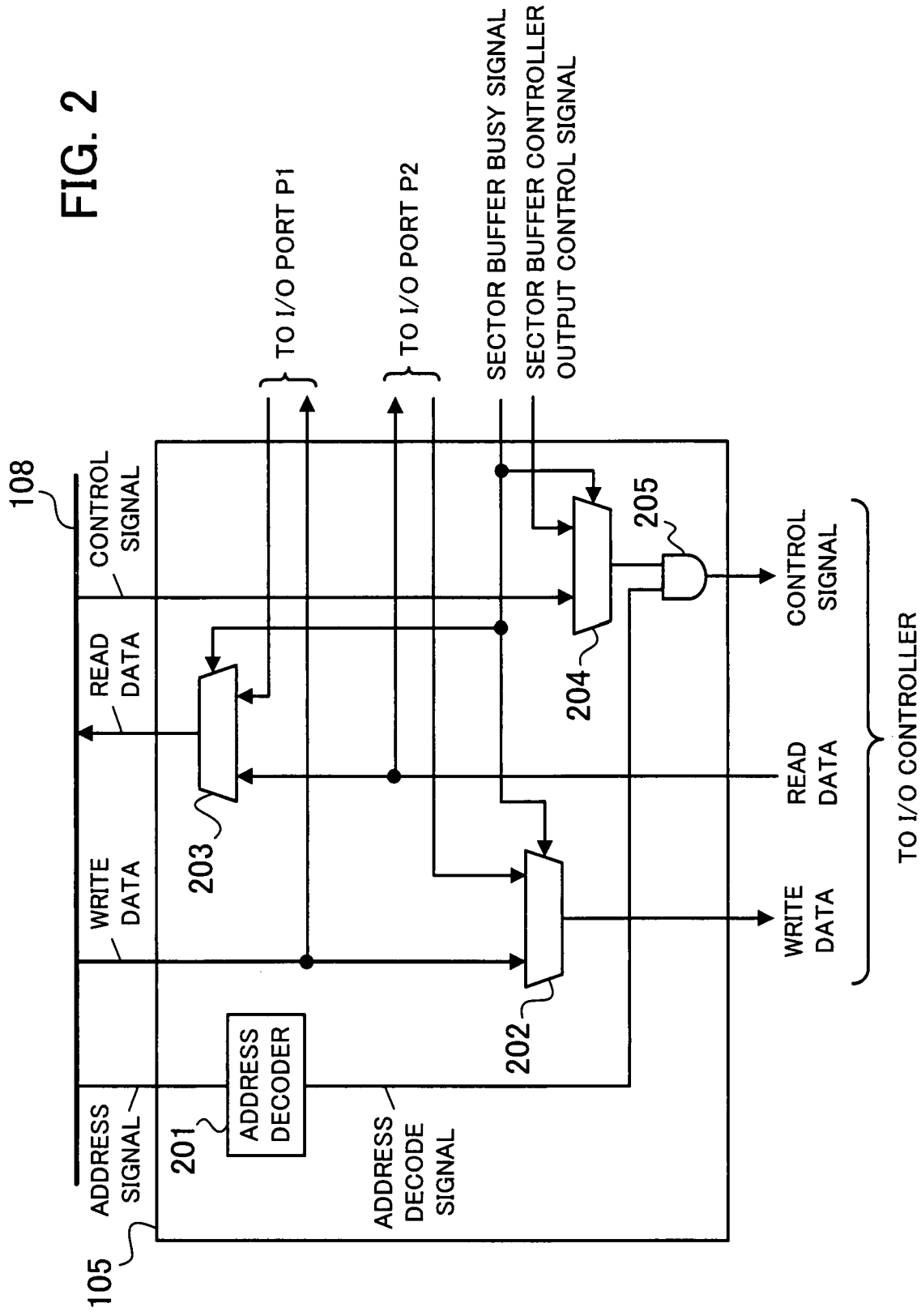
FIG. 2 is a circuit configuration diagram of one example of a switching section in the semiconductor device according to the first embodiment.

FIG. 2 is a circuit configuration diagram of one example of the switching section in the semiconductor device according to the first embodiment.

The switching section 105 has an address decoder 201, selectors 202, 203 and 204, and an AND circuit 205.

The address decoder 201 inputs an address signal through the system bus 108 to generate an address decode signal.

In response to the sector buffer busy signal as one of control signals generated by the sector buffer controller 106, the selector 202 performs switching whether to use, as write data to the I/O device 107a, data from the system bus 108 or data from the I/O port P2 of the sector buffer 104.

In response to the sector buffer busy signal, the selector 203 performs switching whether to use, as read data from the I/O device 107a, data from the I/O controller 107 or data from the I/O port P1 of the sector buffer 104.

In response to the sector buffer busy signal, the selector 204 selects any one of the control signal from the system bus 108 and the control signal such as a chip select signal generated by the sector buffer controller 106.

The AND circuit 205 inputs the control signal outputted from the selector 204 and the address decode signal. When the I/O controller 107 is not started, the address decode signal goes to "0" to mask the control signal.

Figure 3:
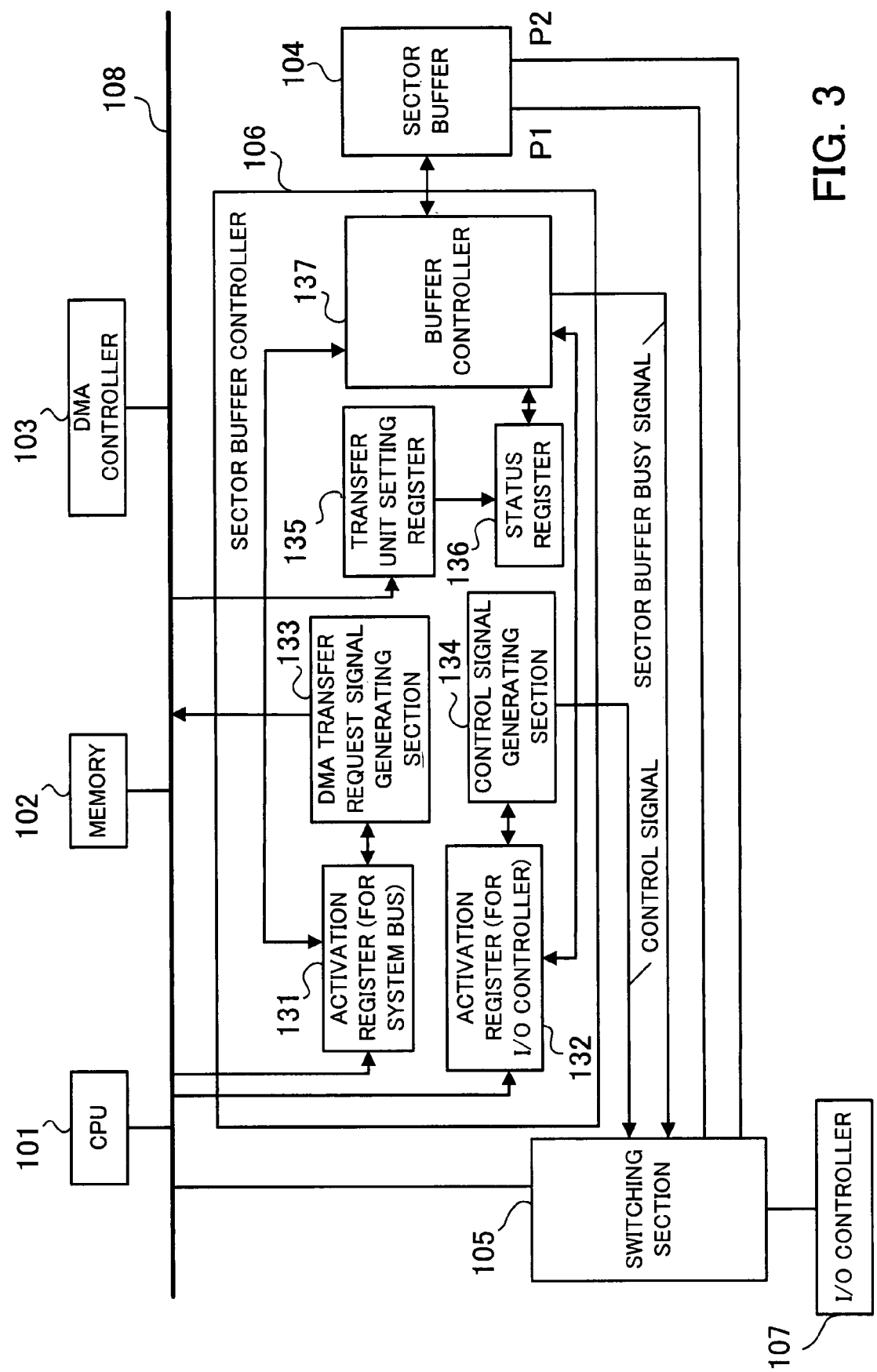
FIG. 3 shows a configuration of one example of a sector buffer controller in the semiconductor device according to the first embodiment.

FIG. 3 shows a configuration of one example of the sector buffer controller in the semiconductor device according to the first embodiment.

The sector buffer controller 106 has an activation register 131 for the DMA transfer with the system bus 108 side, an activation register 132 for the data transfer with the I/O controller 107 side, a DMA transfer request signal generating section 133, a control signal generating section 134, a transfer unit setting register 135, a status register 136 and a buffer controller 137.

In the activation register 131, a start bit is set in starting the DMA transfer between the system bus 108 and the sector buffer 104. The start bit is set through the system bus 108 under the control of the CPU 101.

In the activation register 132, a start bit is set in starting the data transfer between the I/O controller 107 and the sector buffer 104. The start bit is set through the system bus 108 under the control of the CPU 101.

The DMA transfer request signal generating section 133, when a start bit is set in the activation register 131, generates the DMA transfer request signal and transmits the signal to the DMA controller 103 through the system bus 108.

The control signal generating section 134, when the start bit is set in the activation register 132, generates according to the access cycle of the I/O controller 107 a control signal for transmitting to the I/O controller 107, such as a chip select signal, a read strobe signal, a write strobe signal and a byte enable signal, and transmits the signal to the switching section 105. The section 134 may generate according to the access cycle an address signal for specifying an address of the I/O device 107a for storing transfer data, and transmit the signal with the control signal to the switching section 105. The description of this address signal is omitted below.

In the transfer unit setting register 135, a transfer unit by which the CPU 101 performs the status check is set by the CPU 101 through the system bus 108.

The status register 136 stores a status whether the transfer of a transfer unit is completed.

The buffer controller 137 controls transfer of the sector buffer 104 and, when the start bit is set in the activation registers 131 and 132, starts the data transfer through the I/O ports P1 and P2 of the sector buffer 104. Further, the controller 137 detects a status of the status register 136 and, when the transfer of a transfer unit is completed, generates the sector buffer busy signal for connecting the CPU 101 and the I/O controller 107 and transmits the signal to the switching section 105.

Operations of the semiconductor device 100 according to the first embodiment will be described below.

Figure 4:
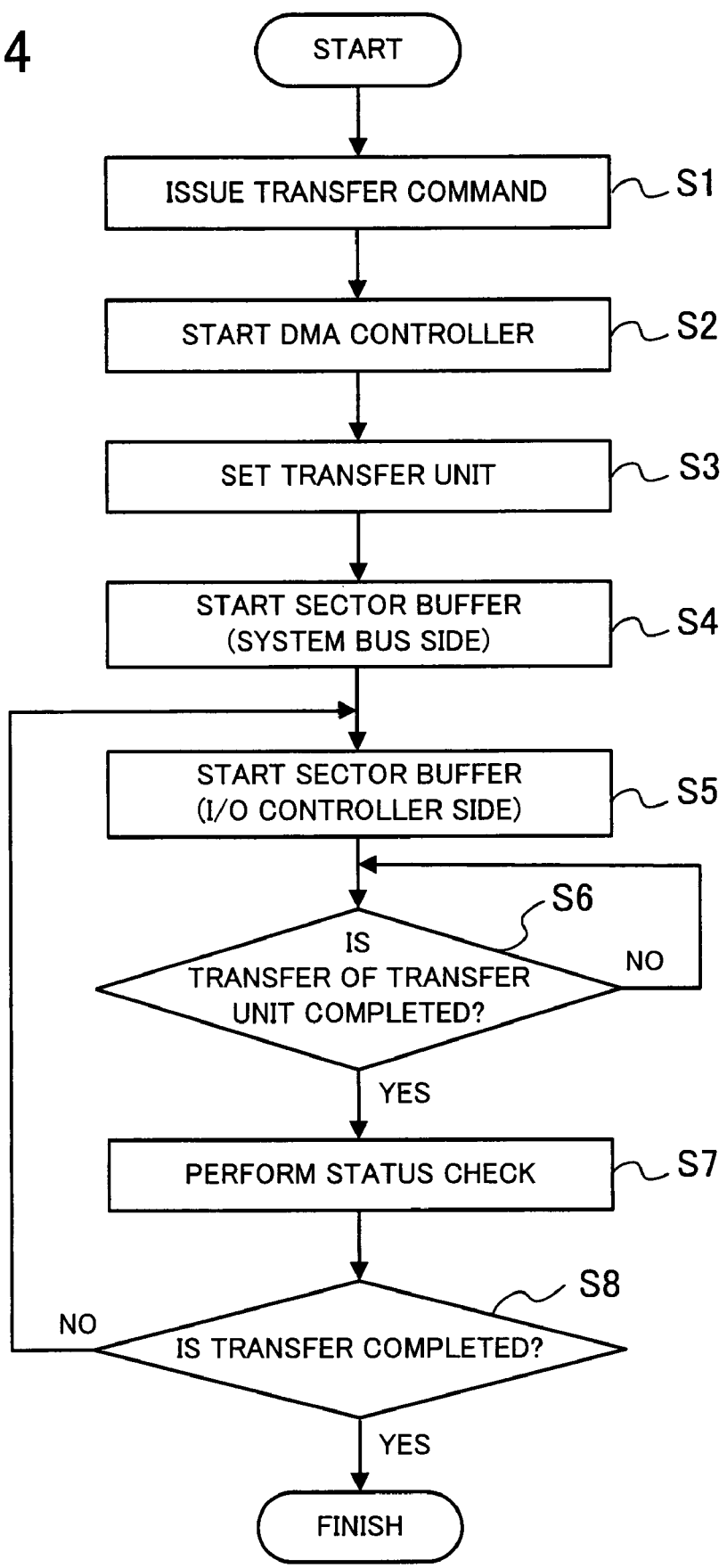
FIG. 4 is a flowchart showing a transfer processing by the semiconductor device according to the first embodiment.

FIG. 4 is a flowchart showing a transfer processing by the semiconductor device according to the first embodiment.

First, the CPU 101 issues a transfer command from the system bus 108 to the I/O controller 107 through the switching section 105 (step S1). At this time, the sector buffer controller 106 inputs, to the selectors 202, 203 and 204 of the switching section 105 in FIG. 2, the sector buffer busy signal (e.g., "0") for connecting the system bus 108 and the I/O controller 107. Therefore, the transfer command (control signal) is inputted to the AND circuit 205 through the selector 204. In transmitting the control signal to the I/O controller 107, the address decode signal goes to "1". As a result, the transfer command is outputted from the AND circuit 205 and inputted to the I/O controller 107.

Next, the CPU 101 sets a transfer mode in the DMA controller 103 and starts the controller 103 (step S2). As the transfer mode, for example, a write operation, a read operation and the number of transfer data are set.

After starting the DMA controller 103, the CPU 101 sets in the transfer unit setting resister 135 of the sector buffer controller 106 the transfer unit for performing the status check (step S3).

Next, in order to initiate the DMA transfer with the system bus 108 side through the I/O port P1 of the sector buffer 104, the CPU 101 sets a start bit in the activation resister 131 of the sector buffer controller 106 (e.g., "1" is written in) (step S4). When the start bit is set, the DMA transfer request signal generating section 133 of the sector buffer controller 106 transmits the DMA transfer request signal to the DMA controller 103 through the system bus 108 for starting the DMA controller 103. For example, in a case of the write operation, when the transfer request is accepted by the DMA controller 103, the DMA transfer is initiated from the memory 102 to the sector buffer 104 through the DMA controller 103.

When the transfer with the system bus 108 side is initiated, the buffer controller 137 of the sector buffer controller 106 asserts the sector buffer busy signal (e.g., the signal goes to "1"). As a result, the selectors 202, 203 and 204 of the switching section 105 in FIG. 2 cut off the connection between the system bus 108 and the I/O controller 107, and connects between the I/O port P1 of the sector buffer 104 and the system bus 108 as well as between the I/O port P2 thereof and the I/O controller 107. In a case of the write operation, the DMA transfer is initiated from the I/O port P1 to the sector buffer 104 through the system bus 108.

Next, in order to initiate the transfer with the I/O controller 107 side through the I/O port P2 of the sector buffer, the CPU 101 sets a start bit in the activation register 132 of the sector buffer controller 106 (e.g., "1" is written in) (step S5). When the activation bit is set, the control signal generating section 134 of the sector buffer controller 106 generates a control signal according to an access cycle of the I/O controller 107 and transmits the signal to the switching section 105. Then, for example, in a case of the write operation, the sector buffer controller 106 transfers from the I/O port P2 to the I/O controller 107 the data stored in the sector buffer 104. In a case of the read operation, read data is inputted from the I/O device 107a to the switching section 105 through the I/O controller 107, and then stored in the sector buffer 104 from the I/O port P2. At this time, the stored data is transferred from the I/O port P1 to the system bus 108 side.

During the data transfer between the sector buffer 104 and the I/O controller 107, the sector buffer controller 106 monitors whether transfer of the transfer unit set in the transfer unit setting register 135 is completed (step S6). When the transfer of the transfer unit is completed, information that the transfer is completed is set in the status register 136. Accordingly, the sector buffer controller 106 stops the transfer through the I/O port P2 of the sector buffer 104 and negates the sector buffer busy signal (e.g., the signal goes to "0"). Thus, the system bus 108 and the I/O controller 107 are connected. Further, the start bit in the activation register 132 is cleared.

In the case of the write operation, even if the connection between the sector buffer 104 and the I/O controller 107 is cut off, since the sector buffer controller 106 separately starts the data transfer through the I/O ports P1 and P2, the storage in the sector buffer 104 of the write data through the I/O port P1 is continued.

When the system bus 108 and the I/O controller 107 are connected, the CPU 101 accesses the I/O controller 107 to perform the status check (step S7). When the status check is normally completed, the CPU 101 determines whether the transfer of the whole data is completed. When the transfer is completed, the CPU 101 clears a start bit of the activation register 131 and completes the transfer processing (step S8). When untransferred data remains, the CPU 101 resets the start bit of the activation register 132 and repeats the processings from step S5. For example, when data with 4096 bytes is desired to be transferred to the I/O device 107a by the transfer unit of 512 bytes, the CPU 101 repeats the above-described processings eight times. Thus, the transfer is completed.

Figure 14:
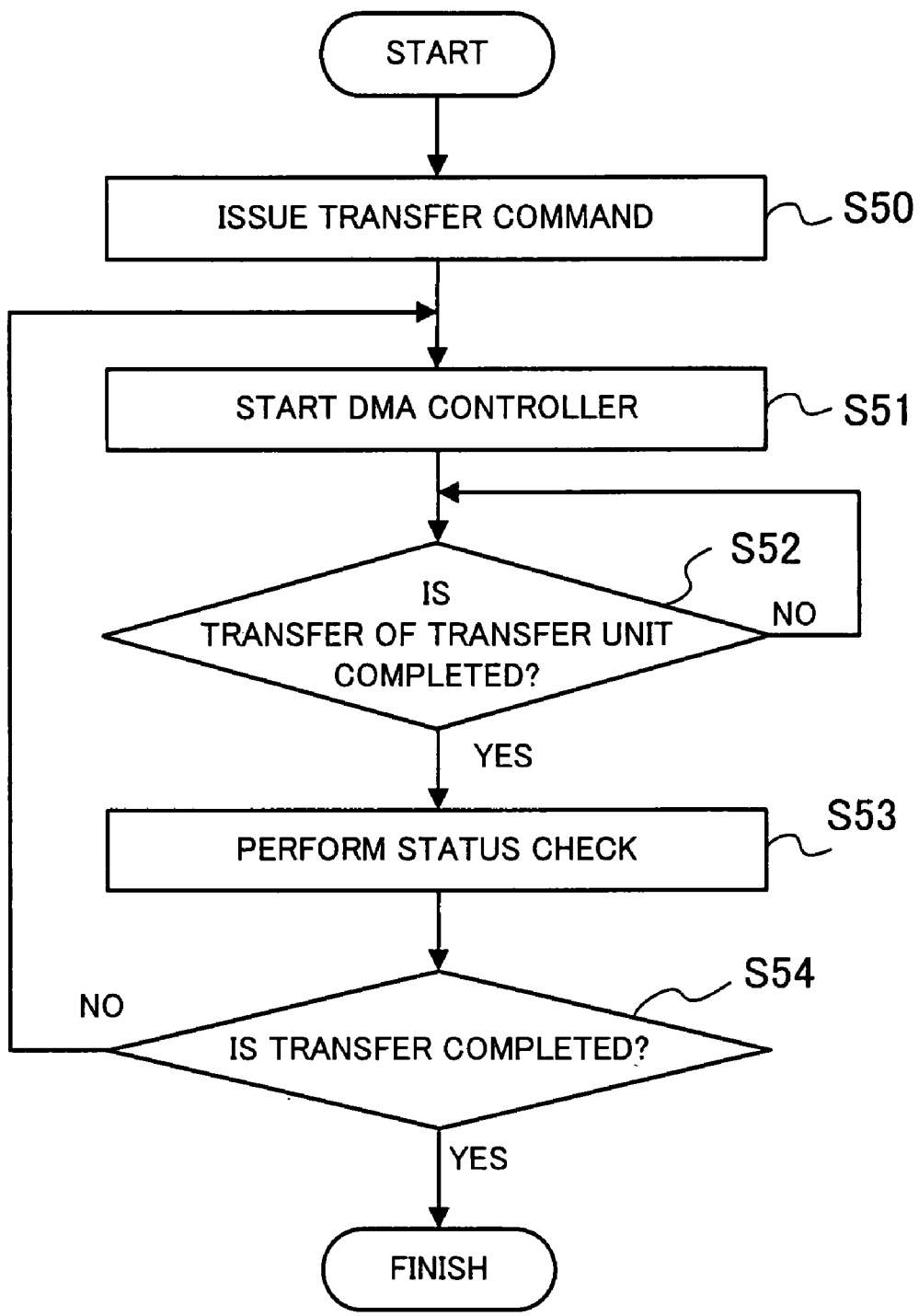
FIG. 14 is a flowchart showing an operation during the DMA transfer to a memory card by the conventional semiconductor device.

As described above, according to the semiconductor device 100 of the first embodiment, the DMA transfer request signal is transmitted to the DMA controller 103 in step S4 until the transfer of the whole data is completed. Therefore, the DMA controller 103 may be started only once. As a result, the DMA transfer processing with lower overhead than that of a conventional transfer processing as shown in FIG. 14 can be realized even if using the I/O controller 107 having no DMA interface.

Next, a signal state in writing data in the I/O device 107a through the DMA transfer processing as shown in FIG. 4 is shown by a timing chart.

Figure 5:
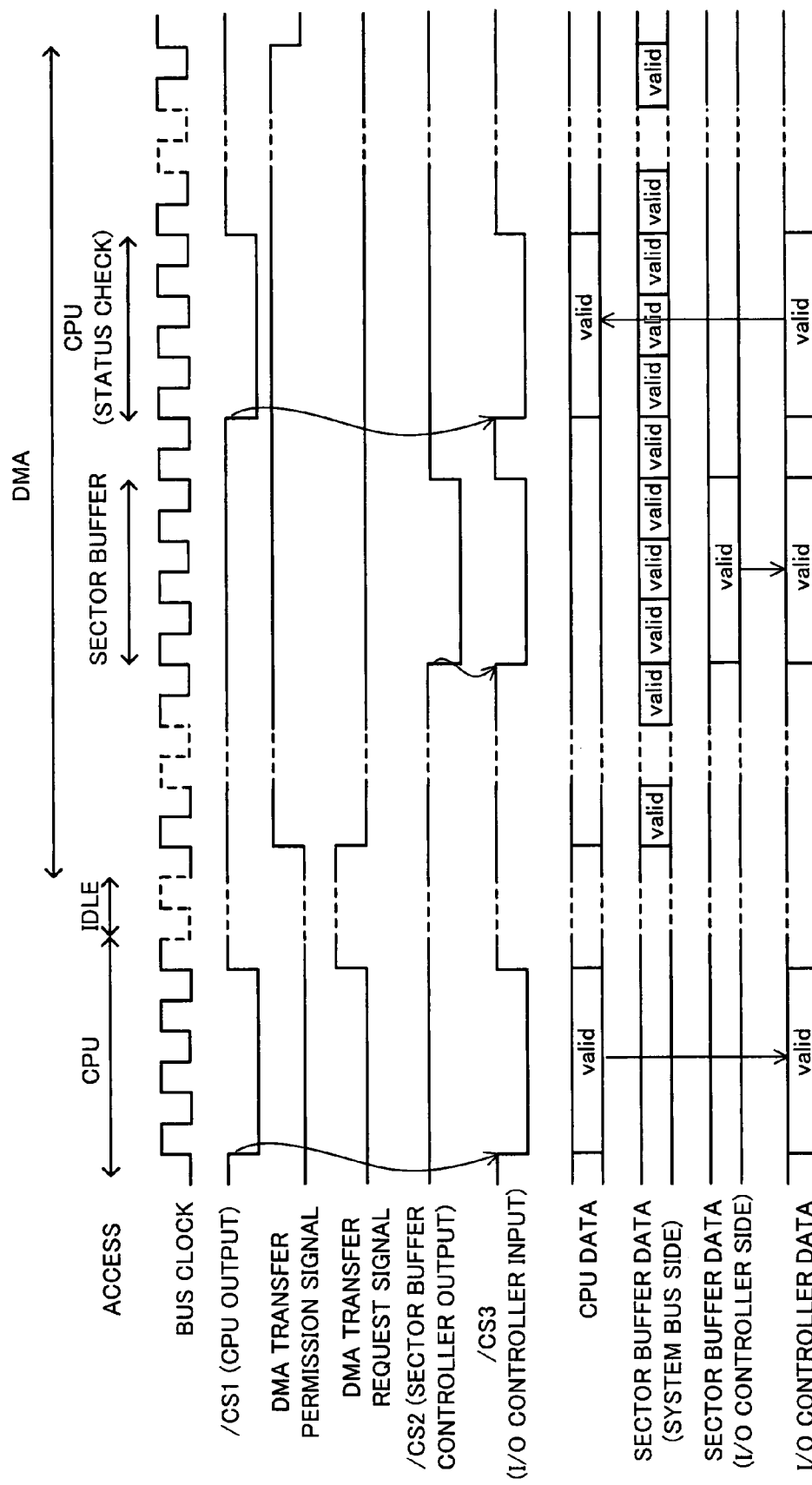
FIG. 5 is a timing chart showing a signal state during the transfer processing of the semiconductor device according to the first embodiment.

FIG. 5 is a timing chart showing a signal state during the transfer processing of the semiconductor device according to the first embodiment.

Starting from the above, FIG. 5 shows a bus clock transmitted through the system bus 108, a chip select signal/CS1 outputted by the CPU 101, a DMA transfer permission signal issued by the DMA controller 103, a DMA transfer request signal transmitted to the DMA controller 103 by the sector buffer controller 106, a chip select signal/CS2 as a control signal generated by the sector buffer controller 106, and a chip select signal/CS3 inputted to the I/O controller 107. Further, FIG. 5 shows data of the CPU 101, data on the system bus 108 side and I/O controller 107 side of the sector buffer 104, and data of the I/O controller 107.

Herein, FIG. 5 shows a case where an access cycle of the I/O controller 107 is three clock cycles.

First, access to the I/O controller 107 by the CPU 101 is performed for the purpose of issuing the transfer command in step S1 of FIG. 4. At this time, the chip select signal/CS1 outputted from the CPU 101 is used as the chip select signal/CS3 of the I/O controller 107. In other words, a command issued from the CPU 101 is transferred to the I/O controller 107.

Successively, when the start bit is set in the activation register 131 of the sector buffer controller 106, the DMA transfer request signal is asserted. At this time, an idle cycle is inserted until the DMA controller 103 is started to assert the DMA transfer permission signal.

When the DMA transfer permission signal is asserted, data is transferred from the DMA controller 103 to the sector buffer 104 through the system bus 108. At this time, for example, the data transfer of one address per clock cycle is performed.

Successively, when the activation register 132 is set, the sector buffer controller 106 asserts the chip select signal/CS2 (the signal goes to "L"). At this time, since the control signal is transmitted to the I/O controller 107 by the above-described operations of the switching section 105, also the chip select signal/CS3 is asserted. Thus, data of the sector buffer 104 is transferred from the I/O port P2 to the I/O controller 107 through the switching section 105.

When the data transfer of the transfer unit is completed, the CPU 101 reasserts the chip select signal/CS1. In the case of completing the data transfer of a transfer unit, since the switching section 105 connects the system bus 108 and the I/O controller 107 by the above-described operations, also the chip select signal/CS3 of the I/O controller 107 is asserted. Thus, the CPU 101 accesses the I/O controller 107 and reads a status to perform the status check.

When the transfer of the whole data is completed, the DMA controller 103 negates the DMA transfer permission signal and completes the transfer processing. When the sector buffer 104 is filled with data, the sector buffer controller 106 may transmit to the DMA controller 103 a signal for stopping the DMA transfer.

In the semiconductor device 100 according to the first embodiment, the data transfer between the sector buffer 104 and the system bus 108 side, and the data transfer between the sector buffer 104 and the I/O controller 107 side are separately started by the sector buffer controller 106. Therefore, also during the data transfer from the sector buffer 104 to the I/O controller 107 or during the status check, data can be transferred by DMA to the sector buffer 104 as shown in FIG. 5.

Figure 13:
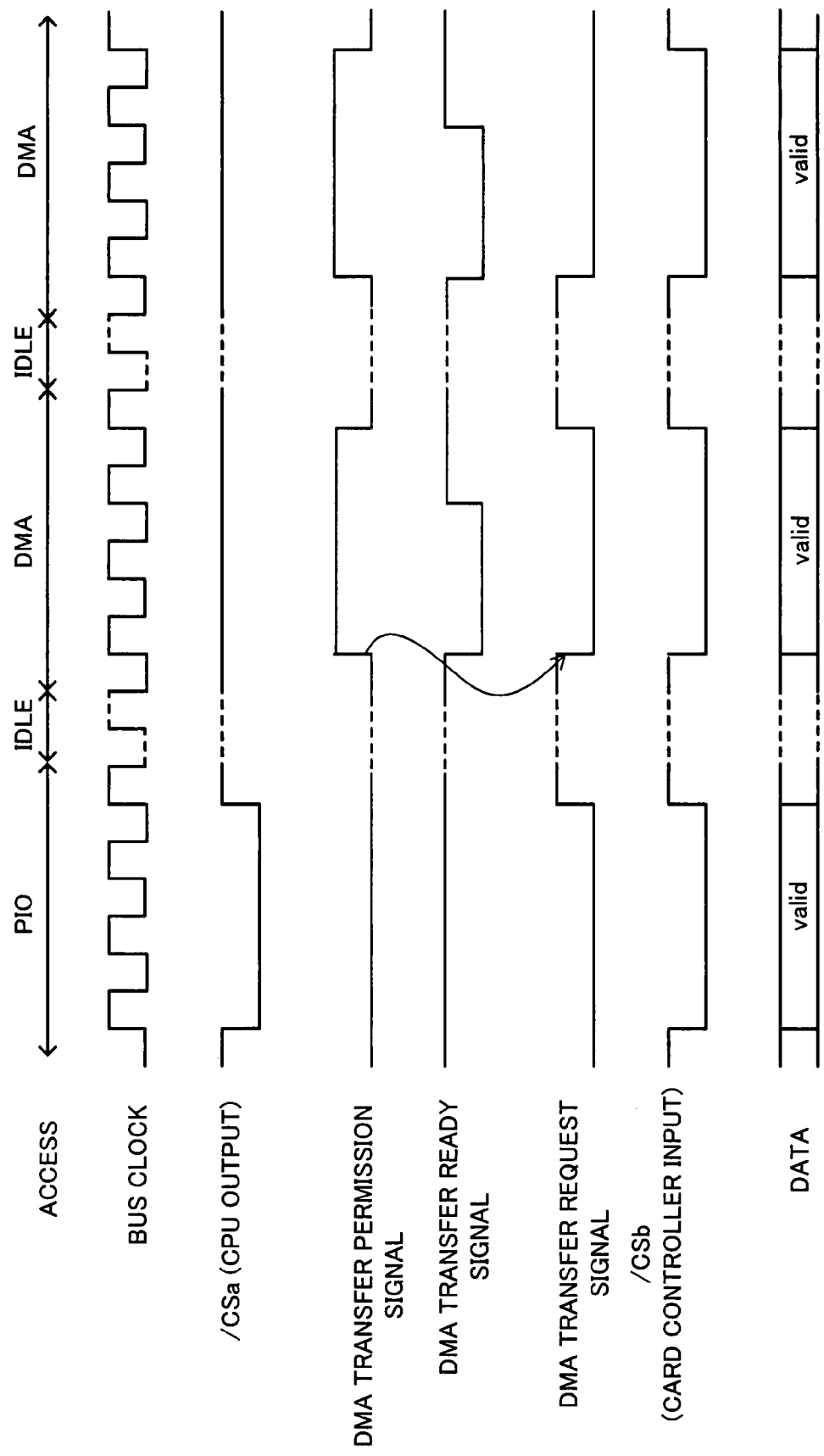
FIG. 13 is a timing chart showing a signal state during the data transfer of the conventional semiconductor device.

In the conventional semiconductor device 500, an access cycle of the PIO transfer is the same as that of the DMA transfer as shown in FIG. 13. Therefore, a transfer efficiency of the DMA transfer is the same level as that of the PIO transfer. However, in the semiconductor device 100 according to the first embodiment, there is avoided the need to match an access cycle of the system bus 108 side to that of the I/O controller 107 side. Therefore, a bus efficiency of the system bus 108 can be improved.

Next, a semiconductor device according to a second embodiment will be described.

Figure 6:
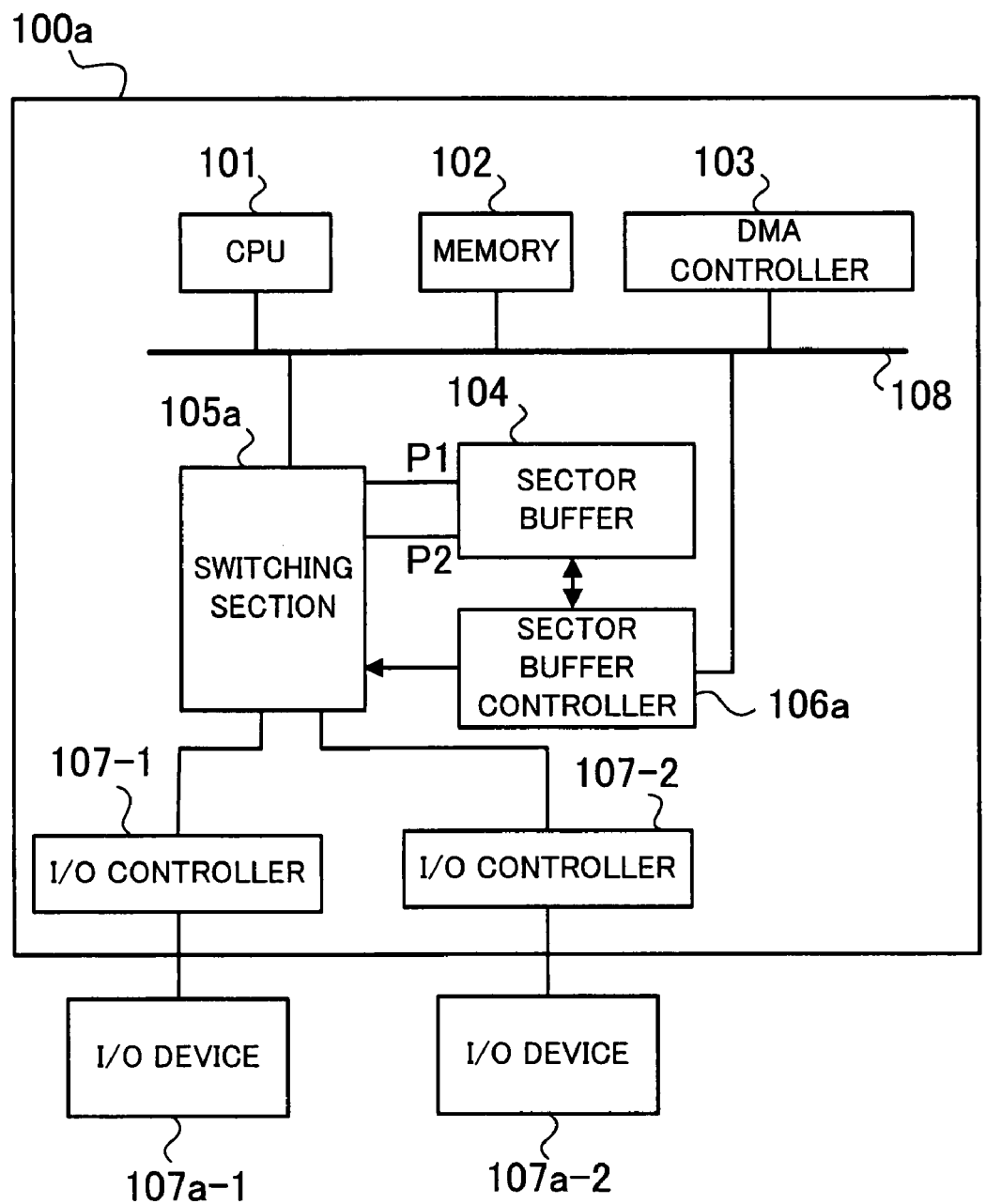
FIG. 6 shows a configuration of a semiconductor device according to a second embodiment.

FIG. 6 shows a configuration of the semiconductor device according to the second embodiment.

In the second embodiment, the same elements as in the semiconductor device 100 according to the first embodiment shown in FIG. 1 are indicated by the same reference numerals as in the first embodiment and the detailed description is omitted.

A semiconductor device 100a of the second embodiment differs from the semiconductor device 100 of the first embodiment. The device 100a has I/O controllers 107-1 and 107-2 corresponding to I/O devices 107a-1 and 107a-2. A switching section 105a must switch the data transfer with these I/O controllers 107-1 and 107-2. Therefore, the section 105a differs from the switching section 105 of the first embodiment shown in FIG. 2.

Figure 7:
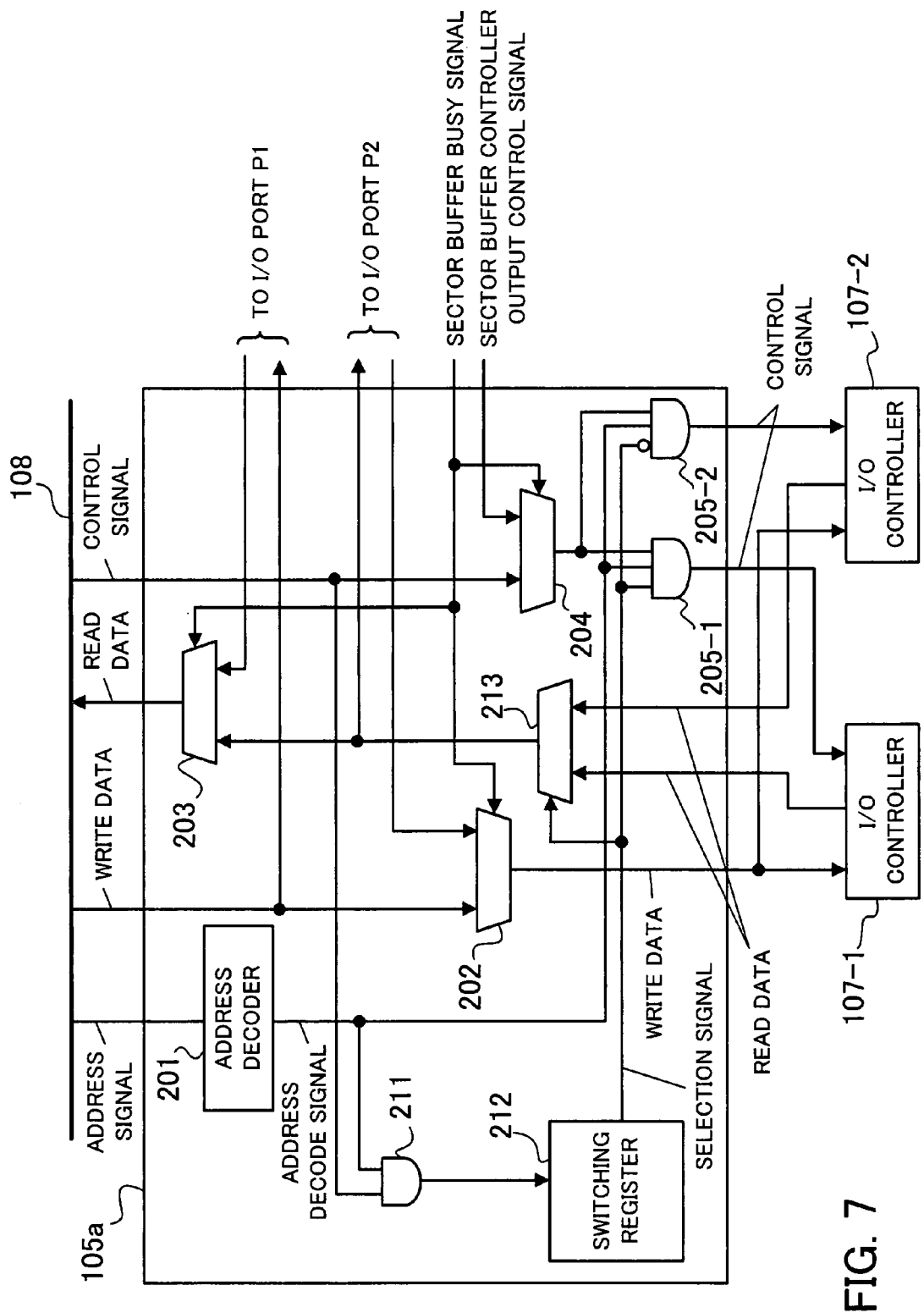
FIG. 7 shows a configuration of one example of a switching section in the semiconductor device according to the second embodiment.

FIG. 7 shows a configuration of one example of the switching section in the semiconductor device according to the second embodiment.

The same elements as in the switching section 105 of the semiconductor device 100 according to the first embodiment shown in FIG. 2 are indicated by the same reference numerals as in the first embodiment.

In the switching section 105a of the semiconductor device 100a according to the second embodiment, the control signal outputted from the selector 204 is inputted to AND circuits 205-1 and 205-2 corresponding to the I/O controllers 107-1 and 107-2. In addition to the configuration in FIG. 2, the section 105a has an AND circuit 211, a switching register 212 and a selector 213.

The AND circuit 211 inputs the control signal (the chip select signal) from the system bus 108, and the address decode signal. Then, the circuit 211 generates information for selecting any one of the I/O controllers 107-1 and 107-2 to store the information in the switching register 212.

The switching register 212 outputs a selection signal for selecting any one of the I/O controllers 107-1 and 107-2, based on the stored information.

The selection signal is inputted to the selector 213. In response to the selection signal, the selector 213 selects any one of the read data of the I/O controllers 107-1 and 107-2 during the read operation and inputs the selected data to the selector 203.

The selection signal is inputted also to the AND circuit 205-1. At the same time, an inverted selection signal is inputted to the AND circuit 205-2. Thus, the control signal is inputted only to the selected I/O controller 107-1 or 107-2.

In the semiconductor device 100a of the second embodiment, when the I/O controllers 107-1 and 107-2 have different access cycles, the sector buffer controller 106a must generate a control signal and address signal according to an access cycle corresponding to each controller.

Figure 8:
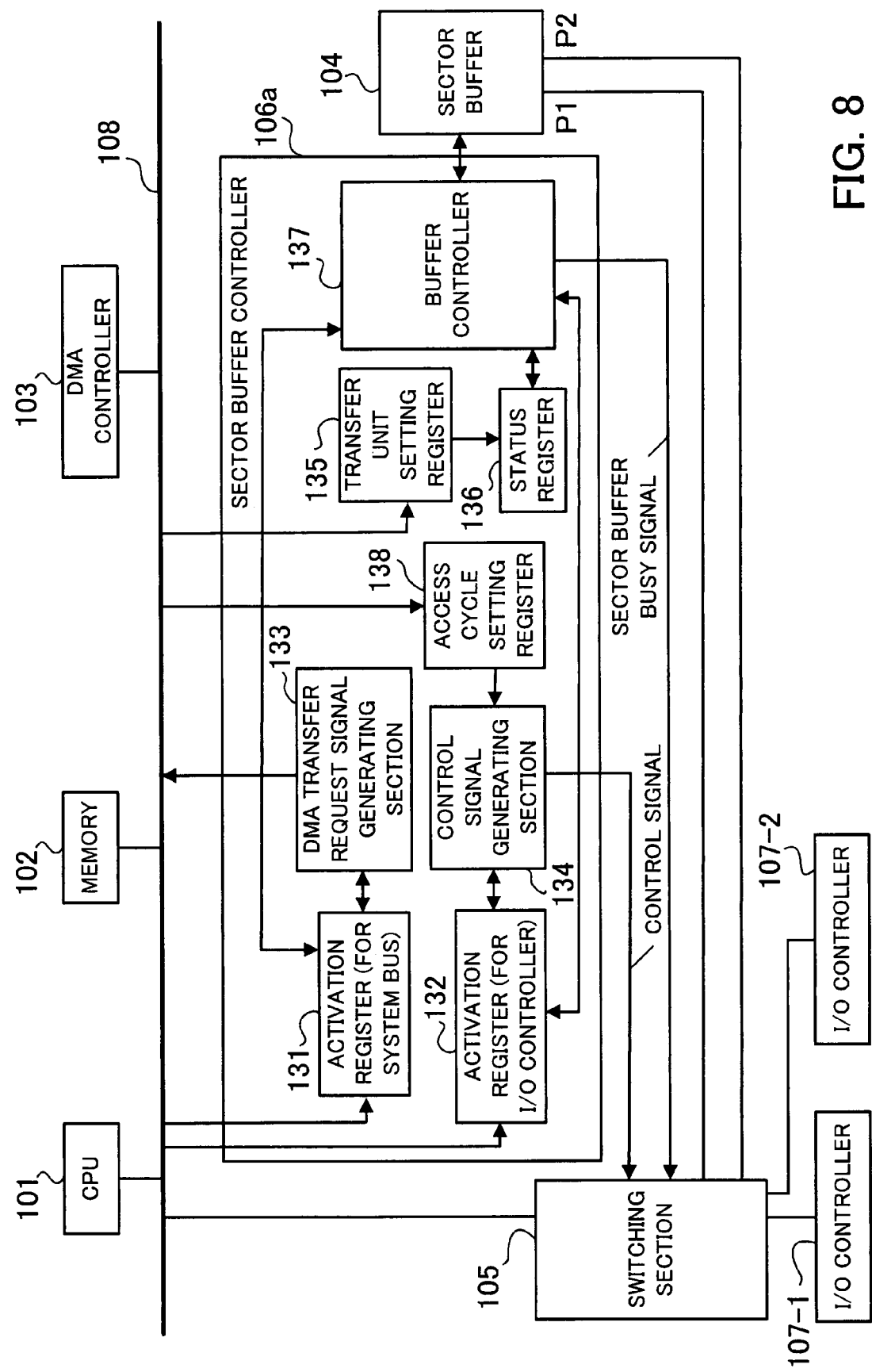
FIG. 8 shows a configuration of one example of a sector buffer controller in the semiconductor device according to the second embodiment.

FIG. 8 shows a configuration of one example of the sector buffer controller in the semiconductor device according to the second embodiment.

In the second embodiment, the same elements as in the sector buffer controller 106 of the semiconductor device 100 according to the first embodiment shown in FIG. 3 are indicated by the same reference numerals as in the first embodiment.

A sector buffer controller 106a of the semiconductor device 100a according to the second embodiment has an access cycle setting register 138. In the register 138, an access cycle corresponding to each of the I/O controllers 107-1 and 107-2 is set via the system bus 108. Therefore, according to the access cycle set in the access cycle setting register 138, the control signal generating section 134 generates a control signal. Further, the section 134 can similarly generate also an address signal according to an access cycle set in the access cycle setting register 138; however, the address signal is not shown in the figure.

Operations of the semiconductor device 100a according to the second embodiment will be described below.

Figure 9:
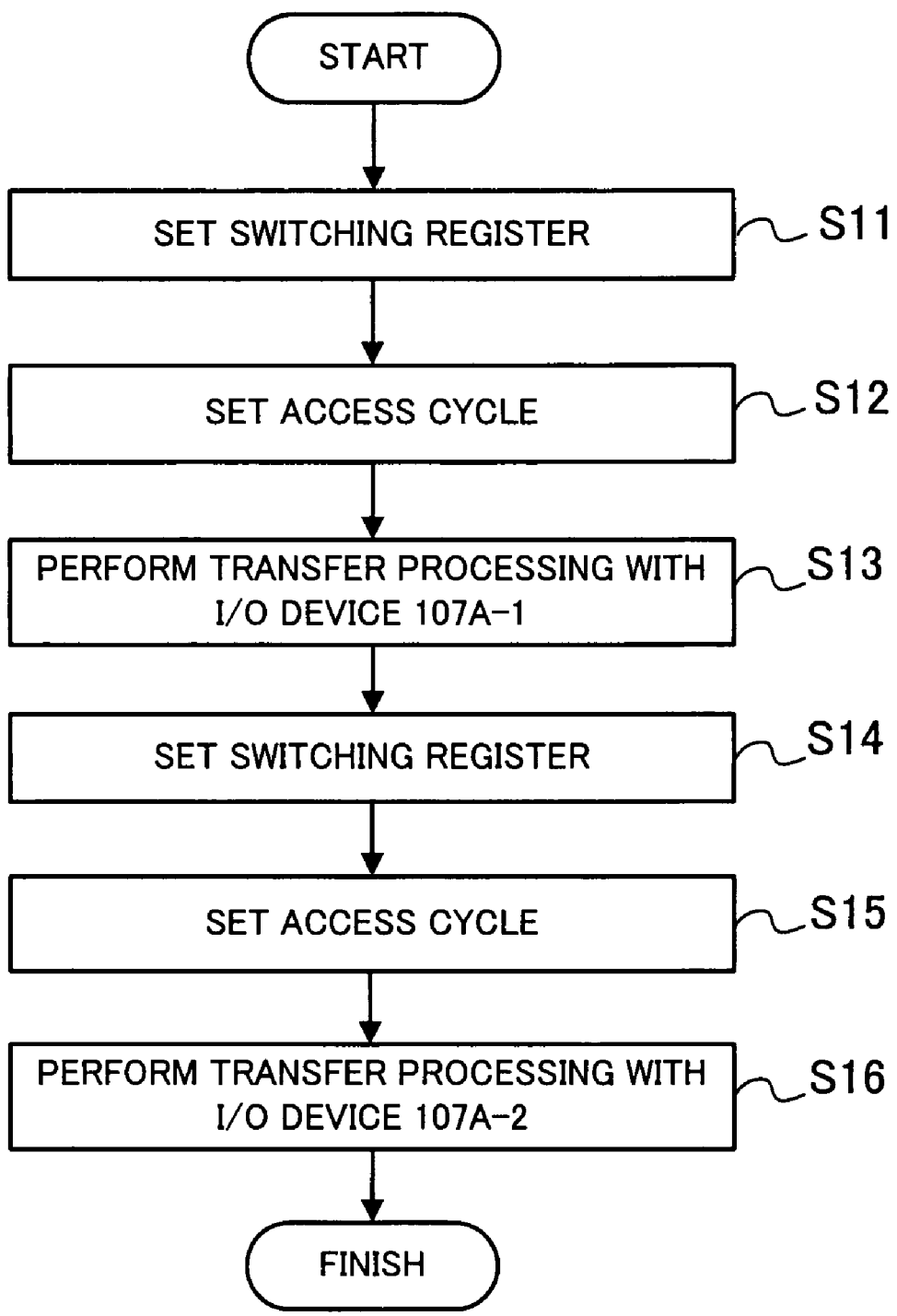
FIG. 9 is a flowchart showing a transfer processing by the semiconductor device according to the second embodiment.

FIG. 9 is a flowchart showing a transfer processing by the semiconductor device according to the second embodiment.

First, for example, "1" is set in the switching register 212 of the switching section 105a. As a result, the output of the AND circuit 205-1 becomes valid and at the same time, the output of the AND circuit 205-2 becomes invalid ("0"). In other words, a path of the I/O controller 107-1 becomes valid (step S11).

Next, an access cycle of the I/O controller 107-1 is set in the access cycle setting register 138 of the sector buffer controller 106a (step S12).

Then, the transfer processing with the I/O device 107a-1 is performed by the transfer processing as shown in FIG. 4 (step S13).

When the transfer processing with the I/O device 107a-1 is completed, "0" is then set in the switching register 212. As a result, the output of the AND circuit 205-1 becomes invalid and at the same time, the output of the AND circuit 205-2 becomes valid. In other words, a path of the I/O controller 107-2 becomes valid (step 514).

Next, an access cycle of the I/O controller 107-2 is set in the access cycle setting register 138 of the sector buffer controller 106a (step 515).

Then, the transfer processing with the I/O device 107a-2 is performed by the transfer processing as shown in FIG. 4 (step S16).

Next, a signal state in writing data in the I/O devices 107a-1 and 107a-2 through the DMA transfer processing as shown in FIG. 9 is shown by a timing chart.

Figure 10:
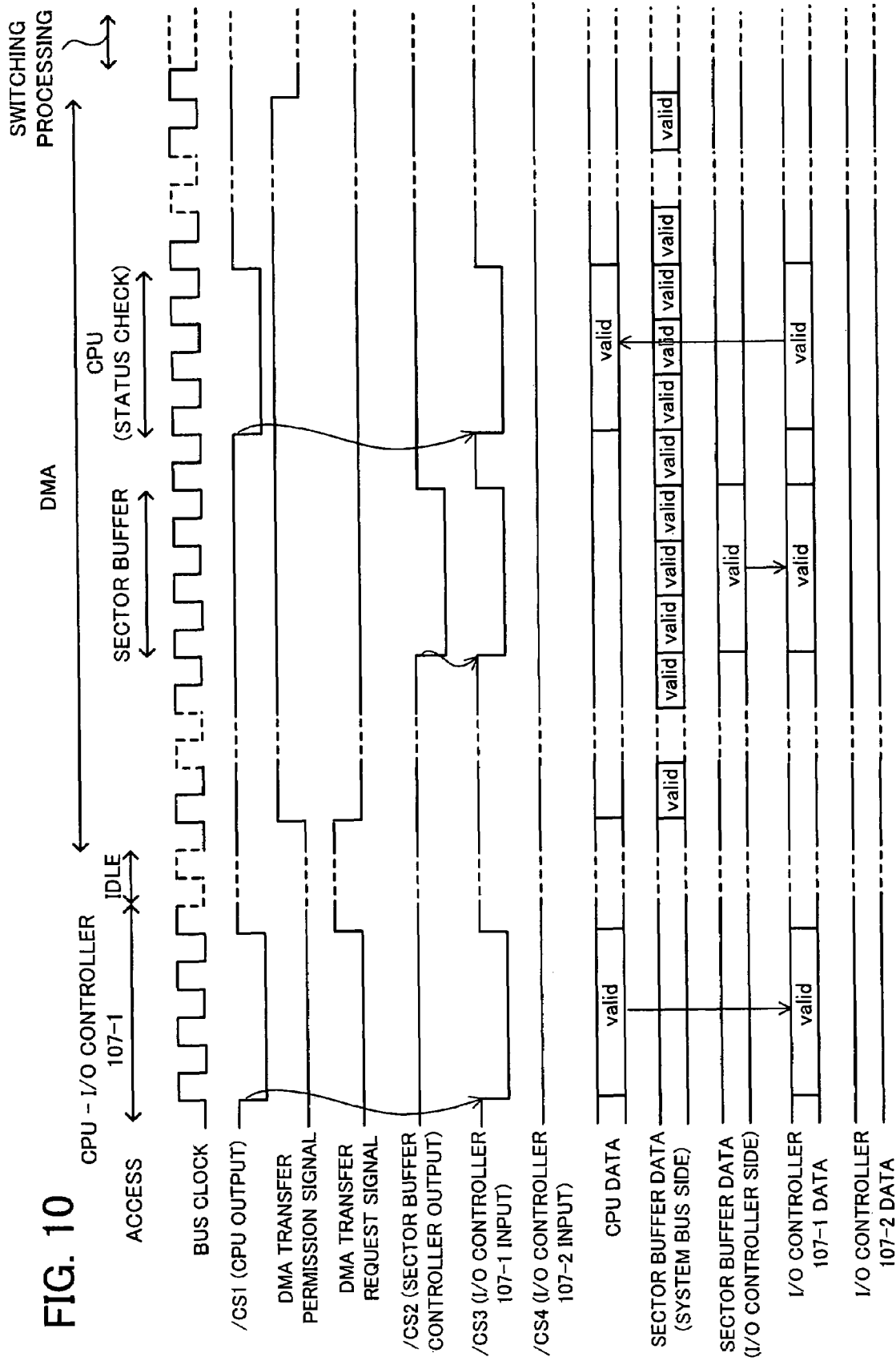
FIG. 10 is a timing chart showing a signal state during the transfer processing in the semiconductor device according to the second embodiment (part 1).
Figure 11:
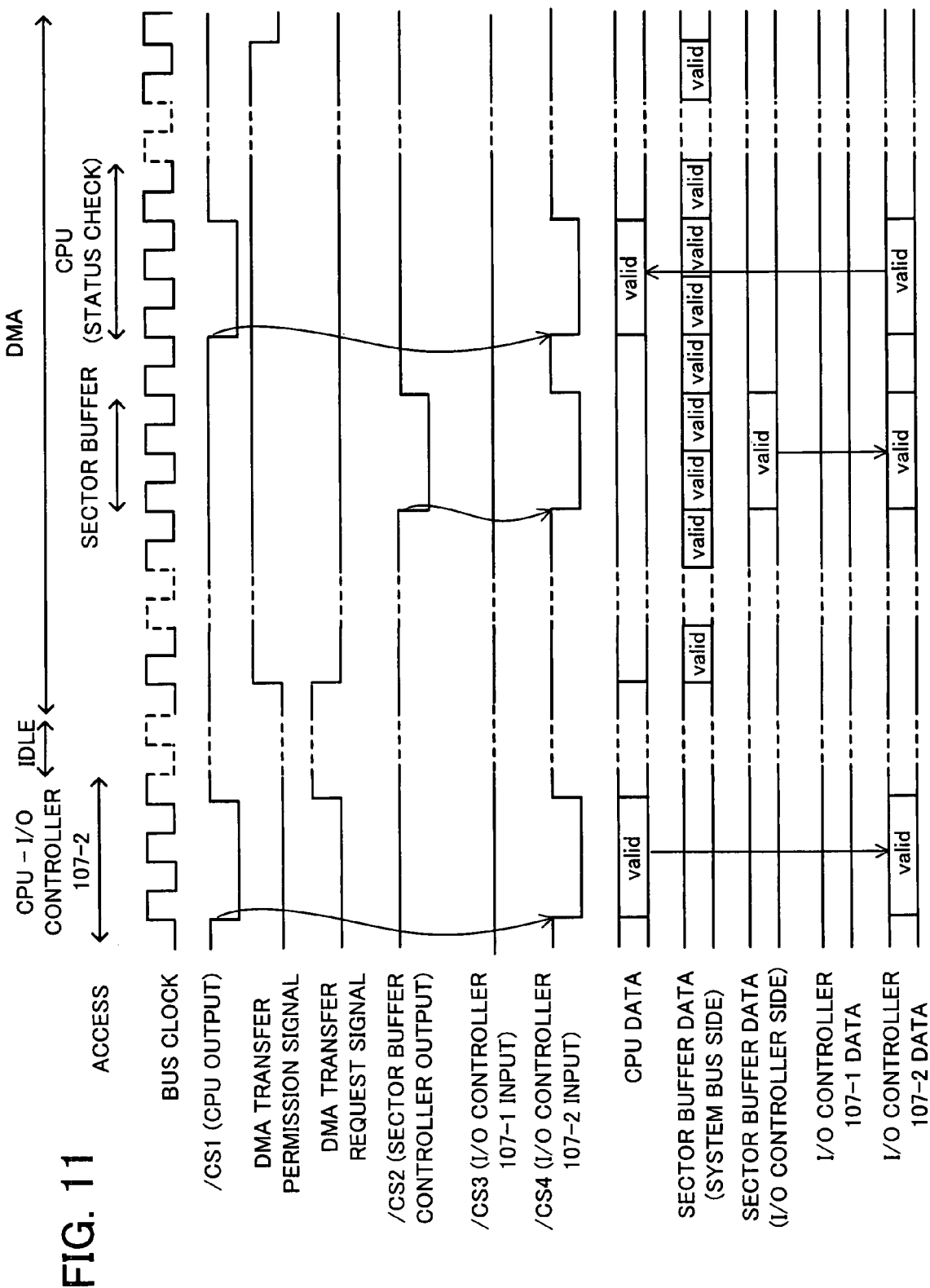
FIG. 11 is a timing chart showing a signal state during the transfer processing in the semiconductor device according to the second embodiment (part 2).
Figure 12:
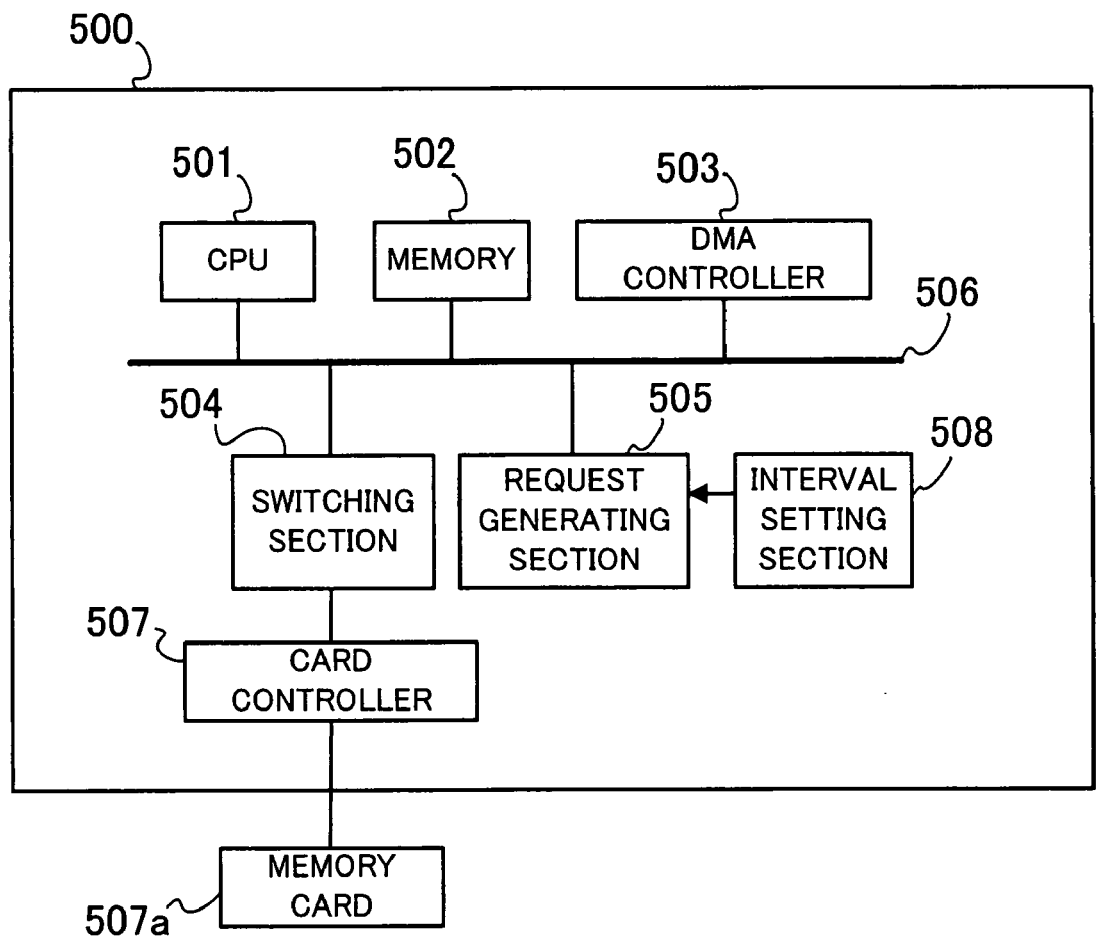
FIG. 12 shows a configuration of a conventional semiconductor device for performing DMA transfer with an I/O device having no DMA interface.

FIGS. 10 and 11 are timing charts showing a signal state during the transfer processing of the semiconductor device according to the second embodiment.

Starting from the above, FIGS. 10 and 11 show a bus clock transmitted through the system bus 108, a chip select signal/CS1 outputted by the CPU 101, a DMA transfer permission signal issued by the DMA controller 103, a DMA transfer request signal transmitted to the DMA controller 103 by the sector buffer controller 106, a chip select signal/CS2 as a control signal generated by the sector buffer controller 106a, a chip select signal/CS3 inputted to the I/O controller 107-1, and a chip select signal/CS4 inputted to the I/O controller 107-2. Further, FIGS. 10 and 11 show data of the CPU 101, data on the system bus 108 side and I/O controllers 107-1 and 107-2 sides of the sector buffer 104, and data of the I/O controllers 107-1 and 107-2.

Herein, FIGS. 10 and 11 show cases where the access cycle of the I/O controller 107-1 is three clock cycles and the access cycle of the I/O controller 107-2 is two clock cycles.

First, the path of the I/O controller 107-1 is made valid by the switching section 105a. Further, the three clock cycles as the access cycle of the I/O controller 107-1 are set in the access cycle setting register 138 of the sector buffer controller 106a.

Then, in the same manner as in the timing chart shown in FIG. 5, the chip select signal/CS1 having three clock cycles outputted by the CPU 101 is inputted as the chip select signal/CS3 of the I/O controller 107-1. In other words, the transfer command is issued to the I/O controller 107-1. Thereafter, the DMA transfer in one clock cycle is initiated.

When the chip select signal/CS2 having three clock cycles generated by the sector buffer controller 106a is asserted, data stored in the sector buffer 104 is transferred from the I/O port P2 to the I/O controller 107-1 through the switching section 105a.

When the data transfer of the transfer unit is completed, the CPU 101 reasserts the chip select signal/CS1 to thereby assert the chip select signal/CS3 of the I/O controller 107-1. Thus, the CPU 101 accesses the I/O controller 107-1 and reads the status to perform the status check.

Thereafter, the switching processing is performed. Herein, the switching register 212 of the switching section 105a is set and the path of the I/O controller 107-2 is made valid. Further, two clock cycles as an access cycle of the I/O controller 107-2 are set in the access cycle setting register 138 of the sector buffer controller 106a.

Then, as shown in FIG. 11, the chip select signal/CS1 having two clock cycles outputted by the CPU 101 is inputted as the chip select signal/CS4 of the I/O controller 107-2. In other words, the transfer command is issued to the I/O controller 107-2. Thereafter, the DMA transfer in one clock cycle is similarly initiated.

When the chip select signal/CS2 having two clock cycles generated by the sector buffer controller 106a is asserted, data stored in the sector buffer 104 is transferred from the I/O port P2 to the I/O controller 107-2 through the switching section 105a.

When the data transfer of the transfer unit is completed, the CPU 101 reasserts the chip select signal/CS1 to thereby assert the chip select signal/CS4 of the I/O controller 107-2. Thus, the CPU 101 accesses the I/O controller 107-2 and reads the status to perform the status check.

When the transfer of the whole data is completed, the DMA controller 103 negates the DMA transfer permission signal and completes the transfer processing. When the sector buffer 104 is filled with data, the sector buffer controller 106a may transmit to the DMA controller 103 a signal for stopping the DMA transfer.

As described above, in the semiconductor device 100a according to the second embodiment, even if the I/O controllers 107-1 and 107-2 having different access cycles are mixed, an efficient transfer processing can be performed in the same manner as in the semiconductor device 100 according to the first embodiment. Further, since the I/O controllers 107-1 and 107-2 can share the one sector buffer 104, an improvement of the cost performance can be expected.

In the semiconductor device 100a according to the second embodiment, a case of using the two I/O controllers 107-1 and 107-2 is described. Further, three or more I/O controllers may be switched using a switching section. Further, three or more access cycles may be set correspondingly to the controllers.

The access cycle setting register 138 may be mounted on the sector buffer controller 106 in the semiconductor device 100 according to the first embodiment shown in FIG. 3.

The method of the present invention uses a temporary storage section having two I/O ports. More specifically, the first I/O port is used for the DMA transfer with a system bus and the second I/O port is used for the data transfer with an I/O controller for controlling the data transfer with an I/O device. The method comprises the steps of: separately starting data transfer using a temporary storage section having first and second I/O ports, the first I/O port being used for DMA transfer with a system bus and the second port being used for data transfer with the I/O controller; switching whether to connect between the system bus and the I/O controller, or to connect between the temporary storage section and the I/O controller or the system bus; and cutting off, when detecting completion of data transfer of a transfer unit between the temporary storage section and the I/O controller, the data transfer between the temporary storage section and the I/O controller to thereby connect the system bus and the I/O controller. Therefore, also during the status check, the DMA transfer using the first I/O port can be performed. Accordingly, the need to restart the DMA controller in each status check is eliminated and as a result, an efficient data transfer is enabled.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A semiconductor device comprising:
a system bus;
an input/output (I/O) device;
an I/O controller which controls data transfer with the I/O device;
a temporary storage section which temporarily stores data during transfer, the temporary storage section comprising a first I/O port used to provide direct memory access (DMA) transfer with the system bus and a second I/O port used to provide data transfer with the I/O controller;
a switching section which switches between a first mode and a second mode, wherein in the first mode, the switching section connects the system bus with the I/O controller, and in the second mode, the switching section connects the system bus with the first I/O port of the temporary storage section and also connects the second I/O port of the temporary storage section with the I/O controller; and
a storage controller which separately starts data transfer through the first I/O port and the second I/O port and which, when detecting completion of the data transfer of a transfer unit between the temporary storage section and the I/O controller, transmits to the switching section a control signal to switch from the second mode to the first mode so as to cut off data transfer between the temporary storage section and the I/O controller and to connect the system bus with the I/O controller.

2. The semiconductor device according to claim 1, wherein the storage controller has two registers in which a start bit is set to separately start data transfer through the first and second I/O ports.

3. The semiconductor device according to claim 1, wherein the storage controller has a register to set the transfer unit.

4. The semiconductor device according to claim 1, wherein the storage controller has a status register to store information indicating whether the data transfer of the transfer unit has been completed.

5. The semiconductor device according to claim 1, wherein the storage controller has a register to store an access cycle of the I/O controller and transmits to the I/O controller a control signal or address signal according to the access cycle.

6. The semiconductor device according to claim 1, wherein:
there is a plurality of the I/O controllers; and
the switching section has a register to store information for selecting any one of the plurality of the I/O controllers.

7. The semiconductor device according to claim 1, wherein the temporary storage section comprises a dual-port RAM.

8. A data transfer method comprising:
separately starting data transfer using a temporary storage section having first and second input/output (I/O) ports, the first I/O port being used to provide direct memory access (DMA) transfer between the temporary storage section and a system bus and the second I/O port being used to provide data transfer between the temporary storage section and an I/O controller;
switching between a first mode and a second mode, wherein in the first mode, the system bus is connected with the I/O controller, and in the second mode, the system bus is connected with the first I/O port of the temporary storage section and the second I/O port of the temporary storage section is connected with the I/O controller; and
when detecting completion of data transfer of a transfer unit between the temporary storage section and the I/O controller, switching from the second mode to the first mode so as to cut off the data transfer between the temporary storage section and the I/O controller and to connect the system bus and the I/O controller.

* * * * *